July 3, 1962
B. H. KRYZER
3,042,431
VALVE PLUNGER SEALING DEVICE
Filed Feb. 17, 1959
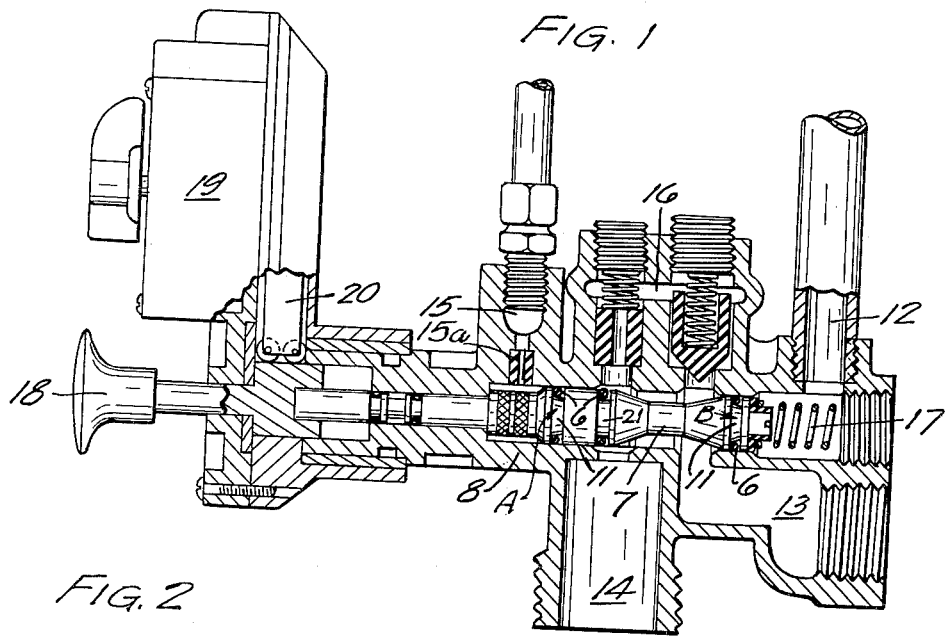
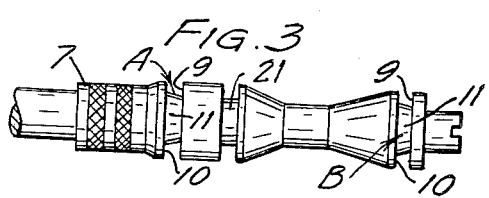
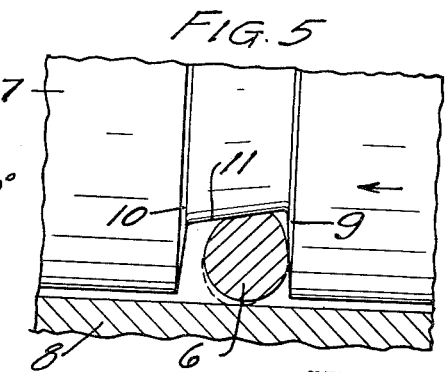
INVENTOR.
BENJAMIN H. KRYZER
BY
John E. Kryzer
ATTORNEY 3,042,431
VALVE PLUNGER SEALING DEVICE
Benjamin H. Kryzer, St. Paul, Minn., assignor, by mesne assignments, to Union Tank Car Company, Chicago, Ill., a corporation of New Jersey
Filed Feb. 17, 1959, Ser. No. 793,788
4 Claims. (Cl. 277—170)

This invention relates to improvements in a sealing device for preventing leakage from one port to another along a longitudinally movable plunger, piston valve or the like, and particularly to means for relieving frictional resistance to movement of the valve caused by the sealing rings when the valve is moved in one direction.

Heretofore sealing rings of the common O ring type have been used extensively in connection with plunger and piston type valves but difficulties have arisen under some conditions of use due to the tendency of the rings to stick and prevent the required movement of the valve, particularly where the valve is spring or fluid actuated in at least one direction.

It is an object of the present invention to eliminate this difficulty and generally to facilitate the movement of such valve members by providing means for causing the sealing ring to retract from a wall of the containing cylinder when the valve is moved in one direction, and at the same time to retain the effectiveness of the seal when subjected to the pressure of fluid tending to flow past the ring in either direction.

A particular object is to provide in a plunger or piston type valve adapted to be moved longitudinally in a substantially cylindrical chamber, one or more sealing rings contained in annular recesses, each recess being defined by spaced end surfaces and a substantially conical surface extending between said end surfaces, the sealing ring being of less thickness than the width of said recess, and being constructed from elastic rubber-like material of such diameter as to be continuously contracted in frictional contact with such conical surface when the valve is moved longitudinally of its axis in either direction. The sealing ring may be either slightly spaced from the wall of the valve chamber or in contact therewith and not under compression when the valve is in one of its end positions.

This application is a continuation-in-part of application No. 531,692, filed August 31, 1955, now abandoned.

Referring to the accompanying drawing, which illustrates by way of example and not for the purpose of limitation, a preferred embodiment of my invention:

FIGURE 1 is a longitudinal sectional view showing my improved sealing device as applied to a semi-automatic valve for the control of water softeners;

FIG. 2 is a front elevational view showing one of the sealing rings;

FIG. 3 is a fragmentary side elevational view showing a portion of the plunger formed with a plurality of my improved grooves for the sealing rings;

FIG. 4 is a fragmentary, enlarged, part sectional view showing details of one of the sealing rings in its plunger groove, with the ring in the compressed position, and FIG. 5 is a similar enlarged view showing the ring in cross section and in its relaxed, uncompressed position in the groove.

As shown in the drawing, one or more sealing rings 6 of the common O ring shape are carried by a valve plunger 7 adapted to be moved longitudinally in a cylindrical chamber indicated generally by the numeral 8. Each of the sealing rings 6 is confined in an annular groove in the plunger 7 defined by end surfaces 9 and 10 and an inner conical surface 11. The surfaces 9 and 10 extend substantially perpendicularly to the axis of the plunger 7 and are spaced apart a distance which is substantially greater than the cross sectional thickness of the sealing rings 6. The spacing of the surfaces 9 and 10 is preferably within the range of 1¼ to 1½ times the thickness of the ring 6. As indicated in FIG. 4, the surface 11 preferably extends at approximately 10 degrees to the axis of the plunger when the spacing of the end surfaces 9 and 10 is equal to 1¼ times the thickness of the ring.

Sealing rings for my purpose may be constructed from an elastic rubber or rubber-like material and must have inside diameters such that they remain under tension in all positions when in place in the grooves formed in the plunger. Thus the ring 6 remains in frictional contact with the conical surface 11 at all times during the operation of the plunger 7.

When the plunger 7 is moved in one direction, as indicated by an arrow in FIG. 4, the ring 6, by reason of the frictional contact with the chamber wall and fluid pressure on the leading side of the ring is moved to its compressed end position where it is in contact with the surfaces 10 and 11 and under compression against the cylindrical wall of the chamber 8. The preferred construction is such that the compression is this end position is approximately equal to 5% of the thickness of the ring 6. When the plunger is moved in the opposite direction, as indicated by an arrow in FIG. 5, the ring 6 moves to the opposite end of the groove wherein it is in contact with the surfaces 9 and 11 and slightly spaced from the wall of the chamber 8. This spacing is so slight, however, that fluid under pressure on the high pressure side of the ring will compress the ring sufficiently to cause it to make contact with the wall as indicated by the broken line in FIG. 5, and thereby prevent leakage between the plunger and wall, irrespective of the direction of the fluid pressure.

As shown in FIG. 3, a plurality of grooves defined by the surfaces 9, 10 and 11 may be formed at suitable spaced intervals along the plunger 7. These grooves, indicated at A and B respectively, are arranged with their conical surfaces converging toward the right end of the plunger but they may be disposed to converge in opposite directions. Between the grooves A and B the plunger 7 is formed with a groove 21 of conventional form to contain a third O ring, as indicated in FIG. 1.

FIG. 1 illustrates an application of my improved sealing device to a valve for control of water softening apparatus such as that described in Patent No. 2,855,042, dated October 7, 1958. In this valve the plunger 7 controls the flow between ports indicated by the numerals 12, 13, 14 and 15 respectively and also through a by-pass 16. The port 12 is an inlet port connected to a supply of water under pressure, port 13 is connected to service outlets, port 14 is alternately an inlet and an outlet port and port 15 is a waste outlet port which is connected by a restricted passage 15a to an annular chamber surrounding the left end portion of the plunger 7. With the plunger in the position indicated in FIG. 1, flow from inlet port 12 is cut off by the ring 6 in groove B, the ring in groove A cuts off flow to the waste port 15 and flow is established from the port 14 to the port 13, the sealing ring in groove 21 being in an inoperative position. Fluid pressure in port 12 now retains the sealing ring in groove B under compression at the left side of groove B and pressure in port 14 retains the ring in groove A in its compressed sealing position.

A coiled spring 17 is disposed to bias the plunger 7 toward the position indicated in the drawing and a knob 18 is operatively connected to the opposite end of the plunger to be manually actuated to move the valve to a second position to the right of the position shown. The control also includes a time control contained in a housing 19 which is operative to actuate a latch member 20 after a predetermined interval of time to release the plunger 7 when it has been set in its second position. When the latch 20 releases the plunger 7, the spring 17 is relied on to actuate the plunger to the position indicated against the friction caused by the sealing rings 6. When the spring 17 is compressed and the latch 20 is operative to retain the plunger in its second position, the port 12 is in communication with the port 13 and also with one end of the by-pass 16, the other end of the by-pass being in communication with the port 14 and the port 14 being in communication with the port 15 through restricted passage 15a. The sealing rings in the grooves A and B are now inoperative, being positioned in enlargements of the valve chamber adjacent to the ports 14 and 12, respectively. The sealing ring in the third or middle groove 21 now seals off port 13 from port 14 and separates the inlet end from the outlet end of the passage 16.

When the timing mechanism releases the plunger the rings 6 in grooves A and B offer substantially no resistance to the plunger movement and the spring is required to overcome the resistance of only a single sealing ring, viz., that of the ring in the groove 21. Thus free movement of the plunger under the force exerted by the spring 17 is insured and the usual difficulty caused by sticking or failure of the plunger to move from one position to another is obviated.

In most installations, the conical surface 11 may be so disposed with respect to the direction of movement of the plunger and direction of the fluid tending to flow past the plunger as to insure a tight seal between the chamber wall and piston with the ring 6 in compressed position indicated in FIG. 4. Unlike one-way seals, it is a characteristic of my improved device that even when the ring 6 is in its end position indicated in FIG. 5, wherein it is slightly spaced from the wall of the chamber 8, there is sufficient restriction between the periphery of the ring and the chamber wall to cause a build-up of pressure and expansion of the ring into sealing engagement with the cylinder wall, as indicated by the broken line in FIG. 5. To secure this result the taper of the conical groove surface and spacing of the end walls of the groove must be correlated to the thickness of the O ring within narrow limits and the ring must be under tension in contact with the conical groove surface in all positions of the ring in the groove.

I claim:
1. In a valve having a plunger movable longitudinally in a substantially cylindrical chamber, improved sealing means comprising, an annular recess formed in said plunger and defined by spaced uninterrupted annular end surfaces extending substantially crosswise of the axis of the plunger and a substantially conical surface extending between said end surfaces from one to the other; and a sealing ring of elastic material confined in said recess, of less width than the spacing of said end surfaces at their junction with said conical surface to permit limited movement of said ring along said conical surface, said ring being under tension and in continuous sealing contact with said conical surface in all positions in said recess, said ring protruding from said recess to be held under compression against the wall of said chamber when in one end position in said recess, the angle of said conical surface relative to the axis of the plunger and the spacing of said end surfaces being such as to retain said sealing ring in close proximity to said wall when said ring is in the opposite end position in the recess, whereby fluid under pressure tending to flow past the ring in either direction is effective to force the ring into sealing engagement with the wall of said chamber.

2. Sealing means in accordance with claim 1 wherein said end surfaces extend substantially perpendicularly to the axis of the plunger.

3. Sealing means in accordance with claim 1 wherein said conical surface extends at an angle of approximately 10 degrees to the axis of the plunger and said end surfaces are spaced apart at their junction with said conical surface a distance approximately equal to one and one-quarter times the thickness of said ring.

4. Sealing means in accordance with claim 1 wherein the spacing of said end surfaces one from the other is within the range of 1¼ to 1½ times the thickness of the ring.

References Cited in the file of this patent
UNITED STATES PATENTS

| | | |
|---|---|---|
| 2,346,051 | Seamark | Apr. 4, 1944 |
| 2,524,142 | Seeloff | Oct. 3, 1950 |
| 2,614,793 | Storm | Oct. 21, 1952 |
| 2,647,810 | McCuistion | Aug. 4, 1953 |
| 2,656,144 | Frantz | Oct. 20, 1953 |
| 2,710,206 | Huber | June 7, 1955 |
| 2,855,142 | Kryzer | Oct. 7, 1958 |

OTHER REFERENCES
Product Engineering, September 1944.